May 18, 1954 L. B. COURTOT 2,678,836
SOLDERING HOSE END FITTING
Filed March 21, 1951
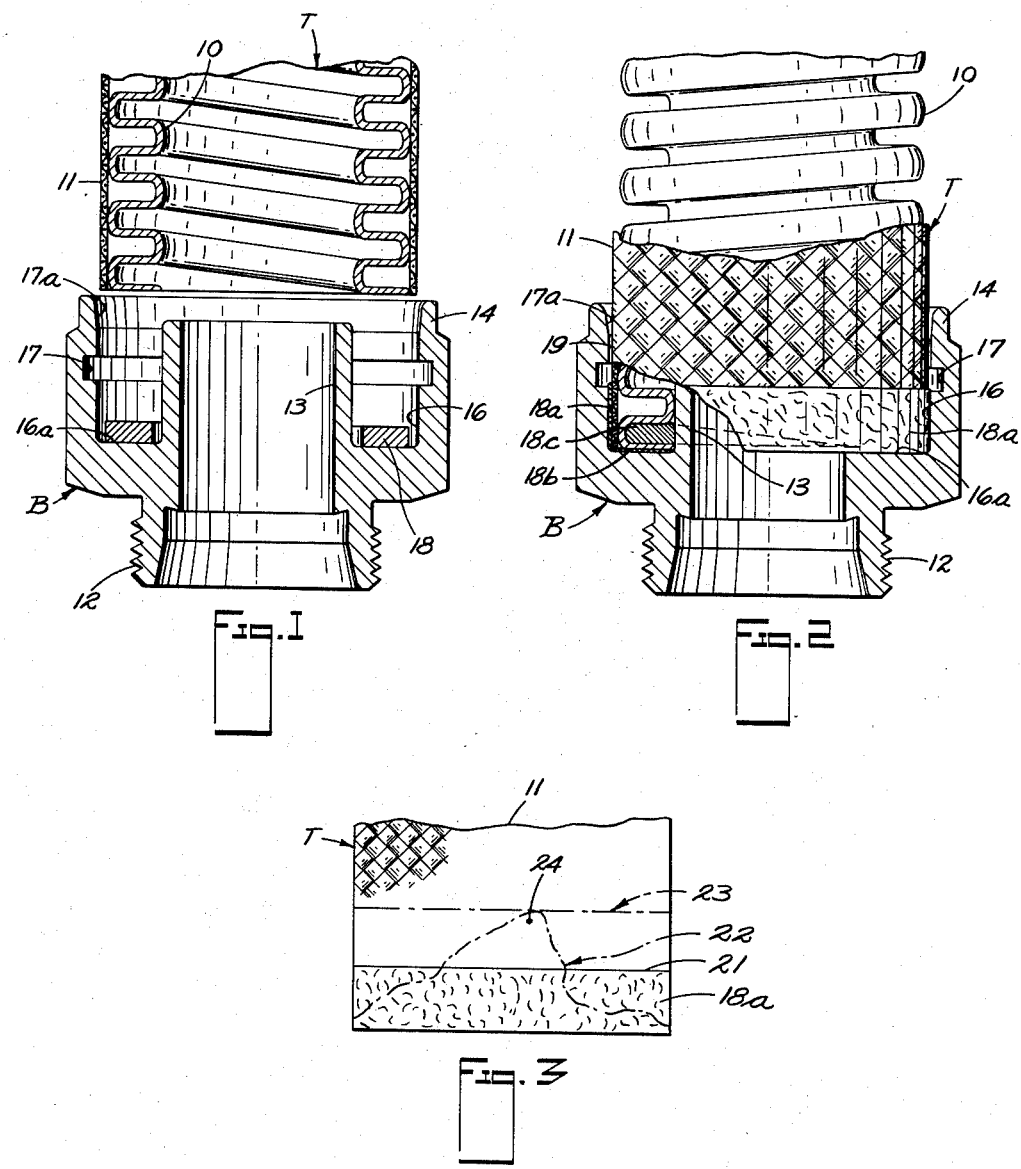
INVENTOR.
LOUIS B. COURTOT
BY
Richey & Watts
ATTORNEYS Patented May 18, 1954

2,678,836

UNITED STATES PATENT OFFICE 2,678,836

SOLDERED HOSE END FITTING

Louis B. Courtot, Cleveland, Ohio, assignor to The Weatherhead Company, Cleveland, Ohio, a corporation of Ohio Application March 21, 1951, Serial No. 216,723

4 Claims. (Cl. 285—115)

This invention relates to hose end assemblies and more particularly to a hose end assembly comprising a fitting or coupling to which is soldered a flexible metal hose.

It has been proposed in hose end assemblies of the type mentioned, to mount the flexible tube in a fitting sleeve and to bond the tube to the fitting by means of solder or a similar bonding agent. In such constructions, it has been found desirable to leave a portion of the tube disposed within the sleeve free of bonding with the sleeve so that limited flexing of the tube (while protected by the sleeve) can take place. However, in practice, it has been found that the clearance between the flexible tube and the sleeve cannot be made uniform about the circumference of the tube before the soldering operation so that, due to capillary action, the solder or other bonding material has a greater axial extent on the side of the tube having least clearance than on the other. This condition has been found to result in premature fracture or breakage of the wire braid that surrounds such tubes where the assembly is subjected to repeated distortion and flexing due either to hydraulic pulses or mechanical bending.

The principal object of the invention is to increase the life of the tube under these conditions, which object is accomplished by forming a groove in the wall of the sleeve that breaks the capillary attraction for the bonding material at the desired zone, thereby insuring that there is an outer zone of predetermined axial extent wherein the tube within the sleeve is not bonded to the sleeve and may thereby have a uniform limited flexing. The manner in which the aforesaid object can be attained will be apparent in the following detailed description of the preferred embodiment of the invention.

In the drawings:

Fig. 1 shows the flexible tube and fitting before assembly;

Fig. 2 shows the completed assembly; and

Fig. 3 is a diagram showing the uniform bonding.

The flexing tube T is of the form embodying a corrugated flexible pipe 10 surrounded by a pressure resistant woven wire braid 11, this construction being well known in the art. The fitting or coupling B has a nipple 12 for attachment with a mating fluid device and a fluid conducting stand pipe 13 which fits snugly within the corrugated pipe 10. Intervening with the body is the tube-receiving sleeve 14 having an inner wall 16 which is of somewhat greater diameter than the nominal diameter of the braid 11, and which is relieved in the preferred form of the invention by internal groove 17. The mouth of sleeve 14 is tapered as at 17a to provide additional clearance with the tube.

Before final assembly, a ring of solder or other bonding or brazing material indicated at 18 is placed within the sleeve against the end wall or shoulder 16a extending between the sleeve 14 and the stand pipe 13. The fitting is then assembled with the tube T and the assembly is heated to the melting point of the bonding material or solder whereupon the latter flows (by capillary action) along the sleeve wall 16 and the braid as indicated at 18a, Fig. 2. A bond is also had between the end of the pipe 10 and the shoulder 16a as indicated at 18b, and it is preferred that enough solder is included at 18 to fill the last wedge-shaped convolution as at 18c.

It will be noted that since the groove 17 breaks the capillary action between the tube and the sleeve there will be a clearance space between the braid and the sleeve as at 19 which has an axial extent that is at least equal to the extent of the sleeve outwardly of the groove. This clearance space allows for limited flexing of the tube due to mechanical action or bending of the tube which bending takes place over a considerable axial extent instead of entirely at the edge of the solder bond.

It will be understood that these tubes may also be subjected to pressure pulses tending to increase their diameter. Of course, that portion of the tube outside of the sleeve may expand without restraint other than that inherent in the tube construction. On the other hand, the portion of the tube within the bond cannot expand. By having a uniform bond terminating intermediate the length of the sleeve, the clearance space 19 may be selected so that part of the bending or stretching takes place at the edge of the bond, part of the remaining expansion force is taken by the sleeve, and another expansion or stretching action takes place just outwardly of the end of the sleeve. Thus, this construction tends to reduce the localized stress and increases the life of the tube. In Fig. 3 is shown diagrammatically the developed view of the tube and the line 21 indicates the maximum extent of the bond attained with this invention. Since the bond is of uniform axial extent and stops short of the sleeve end, this reduces the tendency for all stress to be localized about line 21, as mentioned. In Fig. 3, line 22 indicates the type of bond often attained before this invention wherein the bonding material may extend as far as to the edge of the sleeve, this edge being indicated by line 23. Elimination of the clearance space at the zone 24, for example, has caused high localized stresses to be applied to the braid and fracture of the braid and possibly of the tube is likely to occur at such a point.

A fitting made in accordance with this invention, when assembled with a metal tube, eliminates the possibility of the aforesaid undesirable construction. It will be understood that the nature of the groove, which serves as a relief portion that breaks the capillary flow along the sleeve, may be varied from the preferred form without departing from the principle of the invention as outlined. It will be further understood that the term "solder" as incorporated in the appended claims is not limited to any particular composition of metal but merely indicated in general a bonding or brazing material that has a lower melting point than the melting points of the tube and fitting. Obviously the selection of the bonding material or solder will depend upon the composition of the other parts. If the tube and fitting are made of stainless steel for example, the bonding material or solder could be made of copper or brass where if the parts were formed of low melting point brass the solder would be more likely to be formed of any of the well known alloys of lead and tin. The advantages and principles of the invention are therefore not dependent on the composition or alloy of the various parts going to make up a completed tube and assembly.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A flexible tube end assembly comprising a fitting body having a sleeve portion, a flexible metal tube therein, said body having a bore communicating with the tube, said body formed with an internal annular groove in said sleeve portion intermediate the length thereof, and a solder bond formed by capillary action joining the inner end of the tube to said sleeve portion, said solder bond extending from said groove to a region adjacent the inner end of the tube, the bottom of said groove being spaced from the walls of said tube thereby preventing capillary flow of solder along said tube beyond said groove, the surface of said tube outwardly of said groove being spaced from the adjacent surface of the sleeve portion so as to provide for flexing of the tube within the sleeve portion.

2. A flexible tube end assembly comprising a fitting body having a sleeve portion, a flexible metal tube therein, said body having a bore communicating with the tube, said sleeve portion having an annular relieved portion spaced from the axially inner end thereof, and a solder bond formed by capillary action joining the inner end of the tube to said sleeve portion, said solder bond extending from said relieved portion to a region adjacent the inner end of the tube, the bottom of said groove being spaced from the walls of said tube thereby preventing capillary flow of solder along said tube beyond said groove, the surface of said tube outwardly of said groove being spaced from the adjacent surface of the sleeve portion so as to provide for flexing of the tube within the sleeve portion.

3. A flexible tube end assembly comprising a fitting body having a sleeve portion, a flexible tube comprising a corrugated metal pipe and a braided wire cover thereover, the end of said tube being disposed in said sleeve portion, said body having a bore communicating with the tube, said sleeve portion having an axially inner shoulder and an annular relieved portion spaced axially outwardly of said shoulder, and a solder bond formed by capillary action between the end of said pipe and said shoulder and between the inner end of said braided cover and said sleeve portion, said solder bond extending from said relieved portion to a region adjacent the inner end of the tube, the bottom of said groove being spaced from the walls of said tube thereby preventing capillary flow of solder along said tube beyond said groove, the surface of said braided cover outwardly of said solder bond being spaced from the adjacent surface of the sleeve portion so as to provide for flexing of the tube within the sleeve portion.

4. A flexible tube end assembly comprising a fitting body having a sleeve portion, a flexible tube comprising a corrugated metal pipe and a braided wire cover thereover, the end of said tube being disposed in said sleeve portion, said body having a bore communicating with the tube, said sleeve portion having an axially inner shoulder and an annular groove spaced axially outwardly of said shoulder, and a solder bond formed by capillary action between the end of said pipe and said shoulder and between the inner end of said braided cover and said sleeve portion, said solder bond extending from said groove to a region adjacent the inner end of the tube, the bottom of said groove being spaced from the walls of said tube thereby preventing capillary flow of solder along said tube beyond said groove, the surface of said braided cover outwardly of said solder bond being spaced from the adjacent surface of the sleeve portion so as to provide for flexing of the tube within the sleeve portion.

References Cited in the file of this patent

UNITED STATES PATENTS

| Number | Name | Date |
| --- | --- | --- |
| 953,422 | Jost | Mar. 29, 1910 |
| 1,908,020 | Hulsart | May 9, 1933 |
| 2,120,067 | Gray | June 7, 1938 |
| 2,137,617 | Imes | Nov. 22, 1938 |
| 2,374,226 | Melsom | Apr. 24, 1945 |
| 2,473,879 | Guarnaschelli | June 21, 1949 |
| 2,516,631 | Jacobson | July 25, 1950 |